US006792461B1

(12) United States Patent
Hericourt

(10) Patent No.: US 6,792,461 B1
(45) Date of Patent: Sep. 14, 2004

(54) SYSTEM AND METHOD TO MANAGE DATA TO A PLURALITY OF PROXY SERVERS THROUGH A ROUTER BY APPLICATION LEVEL PROTOCOL AND AN AUTHORIZED LIST

(75) Inventor: Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 09/664,681

(22) Filed: Sep. 19, 2000

(30) Foreign Application Priority Data

Oct. 21, 1999 (EP) .............................................. 99480108

(51) Int. Cl.[7] ........................ G06F 15/173; H04L 12/50
(52) U.S. Cl. ....................... 709/225; 709/218; 709/217; 370/230
(58) Field of Search ................................ 709/203, 217, 709/218, 222, 238, 230, 224, 225, 243; 713/201; 370/255, 230

(56) References Cited

U.S. PATENT DOCUMENTS

| 4,893,307 A | * | 1/1990 | McKay et al. ............... 370/389 |
| 5,341,477 A | | 8/1994 | Pitkin et al. |
| 5,734,865 A | * | 3/1998 | Yu .............................. 709/250 |
| 5,920,705 A | * | 7/1999 | Lyon et al. .................. 709/240 |
| 6,006,258 A | * | 12/1999 | Kalajan ....................... 709/219 |
| 6,157,950 A | * | 12/2000 | Krishnan ..................... 709/223 |
| 6,330,602 B1 | * | 12/2001 | Law et al. ................... 709/224 |

FOREIGN PATENT DOCUMENTS

| EP | 0 909 075 A1 | 4/1999 |
| JP | 06-348622 | 12/1994 |
| JP | 2000-155736 | 6/1996 |
| JP | 10-198642 | 7/1998 |
| JP | 10-262044 | 9/1998 |
| JP | 11-055327 | 2/1999 |
| WO | WO 99/06913 | 2/1999 |

OTHER PUBLICATIONS

Hiroyuki Inoue et al., "Implementation of Load Balancing of WWW Server Using NAT", IPSJ SIG Notes, vol. 96, No. 95, Sep. 27, 1996.

* cited by examiner

*Primary Examiner*—Hosain Alam
*Assistant Examiner*—Ben Bruckart
(74) *Attorney, Agent, or Firm*—Daniel E. McConnell; John R. Pivnichny; Dillon & Yudell LLP

(57) ABSTRACT

A method and system for managing data traffic between an intranet and the internet. The Intranet composed of client computers connected to a router system which bridges the connection to a plurality of proxy servers. The proxy servers act as a gateway to the internet and operate on a designated application level protocol. The router system redirecting packets based on application level protocols to the proxy servers while checking the destination proxy server with an authorized list. The router system blocking or transmitting based on the application level protocol and the authorized server.

8 Claims, 11 Drawing Sheets

End User Accessing the World-Wide-Web

General Physical View of an End User Accessing the World-Wide-Web

Internal Tables of the Web Traffic Policing Extension

Policing Connection Table (612)

| Record (613) |
|---|
| Client_IP_address (614) |
| Client_Port (615) |
| Dest_IP_Address (616) |
| Dest_Port (617) |
| Server_IP_Address (618) |
| Server_Port (619) |
| (613) |
| (613) |

...

ALP Policing Definition Table (606)

| Record (607) |
|---|
| Client_IP_Address (608) |
| Server_IP_Address (609) |
| Server_Port (610) |
| Enforce_Discard (611) |
| (607) |
| (607) |

...

ALP Policing Configuration Table (601)

| Record (602) |
|---|
| ALP (603) |
| ALP_Policing_Definition_Address (604) |
| Frequency (605) |
| (602) |
| (602) |

SYSTEM AND METHOD TO MANAGE DATA TO A PLURALITY OF PROXY SERVERS THROUGH A ROUTER BY APPLICATION LEVEL PROTOCOL AND AN AUTHORIZED LIST

BACKGROUND OF THE INVENTION

1. Technical Field

The present invention relates to computer networks, and more particularly to a method and system, in an Internet Protocol (IP) network, of enforcing the dispatching of Internet Protocol (IP) datagrams on a plurality of servers according to a defined policy.

2. Description of the Related Art

Internet

The Internet is a global network of computers and computer networks (the 'Net'). The Internet connects computers that use a variety of different operating systems or languages, including UNIX, DOS, Windows, Macintosh, and others. To facilitate and allow the communication among these various systems and languages, the Internet uses a language referred to as TCP/IP ('Transmission Control Protocol/Internet Protocol'). TCP/IP protocol supports three basic applications on the Internet:

transmitting and receiving electronic mail, logging into remote computers (the 'Telnet'), and transferring files and programs from one computer to another ('FTP' or 'File Transfer Protocol').

TCP/IP

The TCP/IP protocol suite is named for two of the most important protocols, a Transmission Control Protocol (TCP), and an Internet Protocol (IP).

Another name for it is the Internet Protocol Suite. The more common term TCP/IP is used to refer to the entire protocol suite. The first design goal of TCP/IP is to build an interconnection of networks that provide universal communication services: an internetwork, or Internet. Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network.

TCP is a transport layer protocol providing end to end data transfer. It is responsible for providing a reliable exchange of information between 2 computer systems. Multiple applications can be supported simultaneously over one TCP connection between two computer systems.

IP is an internetwork layer protocol hiding the physical network architecture below it. Part of communicating messages between computers is a routing function that ensures that messages will be correctly directed within the network to be delivered to their destination. IP provides this routing function. An IP message is called an IP Datagram.

Application-level protocols are used on top of TCP/IP to transfer user and application data from one origin computer system to one destination computer system. Such application level protocols are, for instance, File Transfer Protocol (FTP), Telnet, Gopher, and Hyper Text Transfer Protocol (HTTP).

IP Router

A 'Router' is a computer that interconnects two networks and forwards messages from one network to the other. Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term 'IP Router' is often used. However, dedicated network hardware devices called 'Routers' can provide more sophisticated routing functions than the minimum functions implemented in IP.

World Wide Web

With the increasing size and complexity of the Internet, tools have been developed to help find information on the network, often called navigators or navigation systems. Navigation systems that have been developed include standards such as Archie, Gopher and WAIS. The World Wide Web ('WWW' or 'the Web') is a recent and superior navigation system. The Web is an Internet-based navigation system, an information distribution and management system for the Internet, and a dynamic format for communicating on the Web.

The Web seamlessly, for the user, integrates multiple information formats, including still images, text, audio and video. A user on the Web using a graphical user interface ('GUI', pronounced 'gooey') may transparently communicate with different host computers on the system, different system applications (including FTP and Telnet), and different information formats for files and documents including, for example, text, sound, and graphics.

Hypermedia

The Web uses hypertext and hypermedia. Hypertext is a subset of hypermedia and refers to computer-based 'documents' in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web servers, which react, search, and respond. The Web allows client application software to request and receive hypermedia documents (including formatted text, audio, video, and graphics) with hypertext link capabilities to other hypermedia documents, from a Web file server.

The Web, then, can be viewed as a collection of document files residing on Web host computers that are interconnected by hyperlinks using networking protocols, forming a virtual 'Web' that spans the Internet.

Uniform Resource Locators

A resource of the Internet is unambiguously identified by an Uniform Resource Locator (URL), which is a pointer to a particular resource at a particular location. A URL specifies the protocol used to access a server (e.g. HTTP, FTP, . . . ), the name of the server, and the location of a file on that server.

Hyper Text Transfer Protocol

Each Web page that appears on client monitors of the Web may appear as a complex document that integrates, for example, text, images, sounds, and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web servers use a language or protocol to communicate with Web clients which is called Hyper Text Transfer Protocol ('HTTP'). All types of data can be exchanged among Web servers and clients using this protocol, including Hyper Text Markup Language ('HTML'), graphics, sound, and video. HTML describes the layout, contents, and hyperlinks of the documents and pages. Web clients when browsing:

- convert user specified commands into HTTP GET requests, connect to the appropriate Web server to get information, and
- wait for a response. The response from the server can be the requested document or an error message.

After the document or an error message is returned, the connection between the Web client and the Web server is closed.

The first version of HTTP is a stateless protocol. That is, with HTTP there is no continuous connection between each client and each server. The Web client using HTTP receives a response as HTML data or other data. This description applies to version 1.0 of HTTP protocol, while the new version 1.1 breaks this barrier of stateless protocol by keeping the connection between the server and client alive under certain conditions.

Browser

After receipt, the Web client formats and presents the data or activates an ancillary application such a sound player to present the data. To do this, the server or the client determines the various types of data received. The Web Client is also referred to as the Web Browser, since it in fact browses documents retrieved from the Web Server.

Domain Names

The host or computers' names (like www.entreprise.com) are translated into numeric Internet addresses (like 194.56.78.3), and vice versa, by using a method called DNS ('Domain Name Service'). DNS is supported by network-resident servers, also known as domain name servers or DNS servers.

Intranet

Some companies use the same mechanism as the Web to communicate inside their own corporation. In this case, this mechanism is called 'Intranet'. These companies use the same networking/transport protocols and locally based Web servers to provide access to vast amount of corporate information in a cohesive fashion. As this data may be private to the corporation, and because the members of the company still need to have access to public Web information, they protect the access to their network by using special equipment called a Firewall. A Firewall is used to prevent people not belonging to the company from accessing the private Intranet from the public Internet.

Firewall

A Firewall protects one or more computers with Internet connections from access by external computers connected to the Internet. A Firewall is a network configuration, usually created by hardware and software, that forms a boundary between networked computers within the Firewall and those outside the Firewall. The computers within the Firewall form a secure sub-network with internal access capabilities and shared resources not available from outside computers.

Often, access to both internal and external computers is controlled by a single machine, said machine comprising the Firewall. Since the computer, on which the Firewall resides, directly interacts with the Internet, strict security measures against unwanted access from external computers are required.

A Firewall is commonly used to protect information such as electronic mail and data files within a physical building or organization site. A Firewall reduces the risk of intrusion by unauthorized people from the Internet. The same security measures can limit or require special software for people inside the Firewall who wish to access information on the outside. A Firewall can be configured using 'Proxies' or 'Socks' to control the access to information from each side of the Firewall.

Proxy Server

An HTTP Proxy is a special server that allows access to the Internet. It typically runs in conjunction with Firewall software. The Proxy Server:

- waits for a request (for example a HTTP request) from inside the Firewall,
- forwards the request to the remote server outside the Firewall,
- reads the response, and
- sends the response back to the client.

A single computer can run multiple servers, each server connection identified with a port number. A Proxy Server, like an HTTP Server or a FTP Server, occupies a port. Typically, a connection uses standardized port numbers for each protocol (for example, HTTP=80 and FTP=21). That is why an end user has to select a specific port number for each defined Proxy Server. Web Browsers usually let the end user set the host name and port number of the Proxy Servers in a customizable panel. Protocols such as HTTP, FTP, Gopher, WAIS, and Security can have and usually have designated Proxies. Proxies are generally preferred over Socks for their ability to perform caching, high-level logging, and access control, because they provide a specific connection for each network service protocol.

HTTP Caching

HTTP is an application level protocol used by the TCP connections between Web Browsers and HTTP Proxy Servers. Consequently, IP Datagrams exchanged between the Web Browsers and HTTP Proxy Servers comprises HTTP data. Since HTTP Proxy Servers terminate and manage the HTTP connections, they see and handle the HTTP data comprised in the IP Datagrams and they can store a local copy of HTTP data in an internal cache.

When an HTTP Proxy Server receives from a source system (a Web Browser) a request to retrieve HTTP data (a Web page) located on a destination system (a Web server), two situations can occur depending on whether the requested HTTP data is already stored in the local cache, or not. If the requested HTTP data is already located in the local cache, the HTTP Proxy Server immediately sends a response to the source system with the data stored in the cache. If the requested HTTP data is not located in the local cache, the HTTP Proxy Server forwards the request to the destination Web system (the Web server). When the HTTP Proxy Server receives from this destination Web system (the Web Server) the response comprising the HTTP data (the Web page), it caches said HTTP data (the Web page) in its local cache, and forwards the response to the source system (the Web Browser).

When HTTP data are already located within the cache, the request does not need to be forwarded by the HTTP Proxy Server to the destination Web system. A response is immediately returned by the HTTP Proxy server.

The HTTP Caching provides several advantages:

The response time of the HTTP service is improved. The HTTP Proxy Server immediately answers the request to retrieve HTTP data when said HTTP data is already stored in the cache of the HTTP Proxy Server.

The utilitization of network resources is optimized. No traffic is required between the HTTP Proxy server and the destination Web system for requested HTTP data already stored in the cache.

Socks and Socks Server

Socks is a protocol which does some form of encapsulation of application level protocols (for instance FTP, Telnet, Gopher, HTTP). Using Socks, the application level traffic between a system running a Socks Client software and a system running a Socks Server software is encapsulated in a virtual Socks tunnel between both systems. Socks is mainly used by systems within an Intranet in order to gain a secure access to systems located outside the Intranet.

A Socks Server acts as a relay between the systems within the Intranet and the systems outside the Intranet, thus hiding the internal systems from the external Internet. It is considered as one form of Firewall. A Socks Server (also called Socks Gateway) is software that allows computers inside a Firewall to gain access to the Internet. A Socks Server is usually installed on a server positioned either inside or on the Firewall. Computers within the Firewall access the Socks Server as Socks Clients to reach the Internet. Web Browsers usually let the end user set the host name and port number of the Socks Servers in a customizable panel. On some Operating Systems, the Socks Server is specified in a separate file (e.g. socks.conf file). As the Socks Server acts a layer underneath the protocols (HTTP, FTP, . . . ), it cannot cache data (as Proxy does), because it doesn't decode the protocol to know what kind of data it transfers.

Options

The Web Browser often proposes the end user to select between the different options 'No Proxies', 'Manual Proxy Configuration', or 'Automatic Proxy Configuration' to designate the connection between his computer and the Internet.

Users with a direct connection to the Internet should use the default option, which is 'No Proxies'.

If the Intranet is protected by one or several Firewalls, the end user may:
  select one of these Firewalls as the elected Proxy, by entering its host name into the 'Manual Proxy Configuration', or
  automatically refer to the enterprise policy in terms of Proxies attribution between locations, by pointing to a common configuration file in a remote server. This is done by choosing the 'Automatic Proxy Configuration' and by providing the Web Browser with the unique address of the common configuration file ('Universal Resource Locator' or 'URL') located in the remote server.

Today, most of the Web Browsers are configured to forward all requests—even requests for internal hosts—through the Socks Firewall. So when an end user wants to access an internal Web-based application, his request travels to the Firewall, and is then reflected back into the internal network. This mechanism generates internal traffic over a long path, puts extra load on the Firewall and on the network, and worst of all, slows down the response time the end user sees from the applications and Web pages he tries to access. This is called 'non-flexible' Socks access (when everything goes via the Socks Server).

Manual Proxy Configuration

The Manual Proxy configuration in the Web Browser is simple to process. However, the main drawback is that the Firewall (or Proxy) selection is static. There is no dynamic criterion for selecting the Firewall, such as selecting the Firewall according to the response time. Firewall failures require a manual reconfiguration of the navigation software to point to another active Firewall, since the manual configuration usually only allows the definition of one single Firewall per protocol with no possibility to pre-configure a backup Firewall. In addition to the manual proxy configuration in the Web Browser, external procedures can be used to provide some kind of robustness in the Firewall selection. They rely, for instance, on the use of multiple Firewalls having the same name defined as aliases in the Domain Name Server (DNS). But this technique based on alias definition still has drawbacks since, for instance, the DNS is not always contacted for name resolution (association between name and IP address) by Web Clients when said Web Clients locally cache the name resolution. Other techniques using external hardware equipment such as load and request dispatcher provide more robustness and load balancing, but still have drawbacks such as the need for additional and costly hardware.

Automatic Proxy Configuration

Automatic Proxy Configuration (or also referred to as 'autoproxy') can set the location of the HTTP, FTP, and Gopher Proxy every time the Web Browser is started. An autoproxy retrieves a file of address ranges and instructs the Web Browser to either directly access internal IBM hosts or to go to the Socks Server to access hosts on the Internet.

Automatic Proxy Configuration is more desirable than simple Proxy Server Configuration in the Web Browser, because much more sophisticated rules can be implemented about the way Web pages are retrieved (directly or indirectly). Automatic Proxy Configuration is useful to users, because the Web Browser knows how to retrieve pages directly if the Proxy Server fails. Also Proxy requests can be directed to another or multiple Proxy Servers at the discretion of the system administrator, without the end user having to make any additional changes to his Web Browser configuration. In general, these Proxy configuration files (also called 'autoproxy code') are usually written in Javascript language. Autoproxy facility can also contain a file of address ranges for instructing the Web Browser to either directly access internal hosts or to go to the Socks Server to access hosts on the Internet. The Socks Server protects the internal network from unwanted public access while permitting access of network members to the Internet. One of the drawbacks of this 'autoproxy' mechanism is that there is no proactive Firewall failure detection nor response time consideration.

More explanations about the technical field presented in the above sections can be found in the following publications, incorporated herewith by reference:

*TCP/IP Tutorial and Technical Overview* by Martin W. Murhammer, Orcun Atakan, Stefan Bretz, Larry R. Pugh, Kazunari Suzuki, David H. Wood, International Technical Support Organization, October 1998, GG24-3376-05.

*Java Network* Programming by Elliotte Rusty Harold, published by O'Reilly, February 1997.

*Internet in a Nutshell* by Valerie Quercia, published by O'Reilly, October 1997.

*Building Internet Firewalls* by Brent Chapman and Elizabeth Zwichky, published by O'Reilly, September 1995.

Problem

The problem to solve is to police the Web traffic within the Intranet. When multiple Proxy Servers are used by source devices within the Intranet (for instance workstations running Web Browser software) to get access to Web systems located within the Internet, access rules are usually defined by the Network Administrator. The purpose of said access rules is to define the Proxy Server that should be used by each source device (workstation) or each group of source devices (group of workstations) within the Intranet, to get access to Web systems located within the Intranet. For instance, source devices located in France should use a Proxy Server located in France, while source devices located in Germany should use a Proxy Server located in Germany.

Said access rules may be different according to the application level protocol (ALP). ALP traffic refers to IP Datagrams comprising data using said ALP (for instance, HTTP traffic refers to all IP Datagrams comprising HTTP data). For instance, the access rules may stipulate that source devices located in Belgium should access one specific Proxy Server located in France for HTTP traffic, and should access another specific Proxy Server located in Belgium for FTP traffic. These access rules define a policy for accessing the Web from the Intranet, and are therefore called 'Web access policy' or 'Web traffic policy'. The main goals of said Web traffic policy are to:

Optimize the network resources within the Intranet. For instance, the specifications and therefore the cost of a Proxy Server depend on the number of source devices which will have access to it. A Proxy Server which will be accessed by 500 source devices will be smaller and therefore cheaper than a Proxy Server which will be accessed by 10000 source devices.

Improve the performances of the Web access service (access from source devices to Web systems located within the Intranet). For instance, a Proxy Server set-up in France is configured to provide a Web access service to a specified number of source devices in France. When more source devices (for instance source devices located in Belgium) than expected are accessing said Proxy Server, the performance of said Proxy server may be degraded and may have an impact on the Web access service.

Optimize the utilisation of network resources, in particular, minimize the bandwidth required within the Intranet for accessing Web systems. For instance, when a source device located in France wants to access a Web system through a Proxy Server, said source device should use a Proxy Server located in France instead of a Proxy server located in Japan, in order to minimize the path (and consequently to minimize the network resources utilization and the bandwidth between France and Japan) within the Intranet to reach the Proxy server.

Take advantage of Web traffic caching, since Proxy Servers usually provide HTTP and FTP caching:

The utilisation of the network resources located between the Proxy Server and the Web system is optimized. No traffic is required between the Proxy Server and the destination Web system, when HTTP data requested by a source device is already located within the cache of said Proxy Server.

The response time of the HTTP service is improved. The requests to retrieve HTTP data already located within the cache on the HTTP Proxy Server, are immediately satisfied by the HTTP Proxy Server.

It is generally admitted that an efficient Web Caching must be done as close as possible to source devices. Thus, it is important for said source devices to have access to a Proxy server located close to them.

The problem is to apply the Web access policy within the whole Intranet. For instance, when the Web access policy defines that source devices located in France should use one specific Proxy Server located in France, the problem is to make sure that said source devices actually use said specific Proxy Server and do not use instead another Proxy Server (for instance located in Japan).

The current solutions address this problem partially:

The Web Application software (for instance a Web Browser) running on the workstation can be manually configured with the target Proxy Servers. The main drawback of this solution is the following:

Proxy Server names must be known and manually configured by end users. Wrong Proxy Server names may then be entered by end users, and the Web traffic policy is then not applied. For instance, an end user located in Toulouse (France) may manually configure his Web Browser to use a Proxy Server located in Paris instead of a Proxy Server located in Toulouse.

Web Browsers can be configured with their autoproxy feature. In this case, a static list of target Proxy Servers (a Web traffic policy) is downloaded to the Web Browser from a dedicated autoproxy URL (Uniform Resource Locator) system. The main drawbacks of this solution are the following:

The end user must configure his Web Browser to use the autoproxy feature. If the end user does not configure his Web Browser correctly, the Web traffic policy is then not applied.

The autoproxy feature has to be implemented within the Intranet. For instance, an autoproxy code must be implemented on the autoproxy URL system.

SUMMARY OF THE INVENTION

An object of the present invention is to enforce the dispatching of Internet Protocol (IP) datagrams on a plurality of servers according to a defined policy.

It is another object of the present invention to optimize the performances of the Web access service, by enforcing the source devices to access the Internet though specific Proxy Servers according to a particular Web traffic policy.

It is yet another object of the present invention to optimize the utilisation of the Intranet network resources, by reducing the Web traffic within the Intranet network.

It is a further object of the present invention to simplify the configuration of the devices source of the Web traffic within the Intranet.

A method and a system, in a network device, of enforcing the dispatching of Internet Protocol (IP) datagrams on a plurality of servers according to a defined policy, each IP datagram being sent from a source port on a source device to a destination port on a destination device in an Intranet network comprising a plurality of servers and at least one client. The method comprises the steps of:

determining whether the source device of an incoming IP datagram is a client or a server;

If the source device of the IP datagram is a client:
identifying client address, client port, destination address, and destination port of the IP Datagram;
searching for a server address and a server port in a first table, this first table comprising a server address and a server port for each connection identified by a client address, a client port, a destination address and a destination port;

If a server address and a server port are identified in said first table, and if said server address and the destination address are different or if said server port and the destination port are different:
replacing the destination address and the destination port in the IP datagram respectively by the server address and the server port;

sending the IP datagram over the IP network.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 6 shows the tables used by the Web Traffic Policing Extension, according to the present invention;

DETAILED DESCRIPTION OF THE PREFERRED EMBODIMENT

Access to the World Wide Web

Logical View

Figure 1:
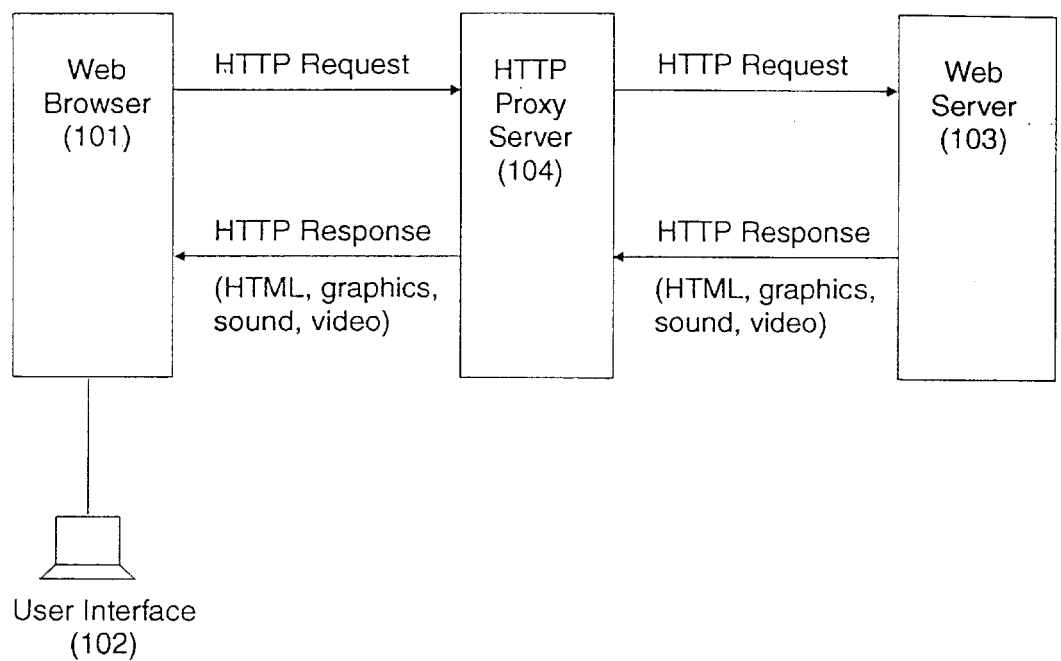
FIG. 1 is a logical view of an end user system accessing the World Wide Web, according to prior art.

FIG. 1 shows a user system with a user interface 102 comprising a Web Browser 101 for accessing the World-Wide-Web (WWW). The WWW content is transferred using the HTTP protocol. HTTP requests and responses are exchanged between the Web Browser program 101 and a destination Web Server 103 containing the WWW information the user wants to access. The Socks Server 104 between the Web Browser 101 and the Web Server 103 acts as an intermediary HTTP Relay forwarding the HTTP requests and responses to their destination. The Web Browser program 101 makes an HTTP request to the HTTP Proxy Server 104 and the HTTP Proxy Server forwards the request to the destination Web Server 103. The flow in the reverse direction (HTTP response) again goes via the HTTP Proxy Server 104 to the Web Browser 101. In this way the HTTP Proxy Server can limit the traffic to authorized transactions according to its configuration (based on some defined security and access control policy). The HTTP Proxy Server hence protects the network where Web Browser is located.

Physical View

Figure 2:
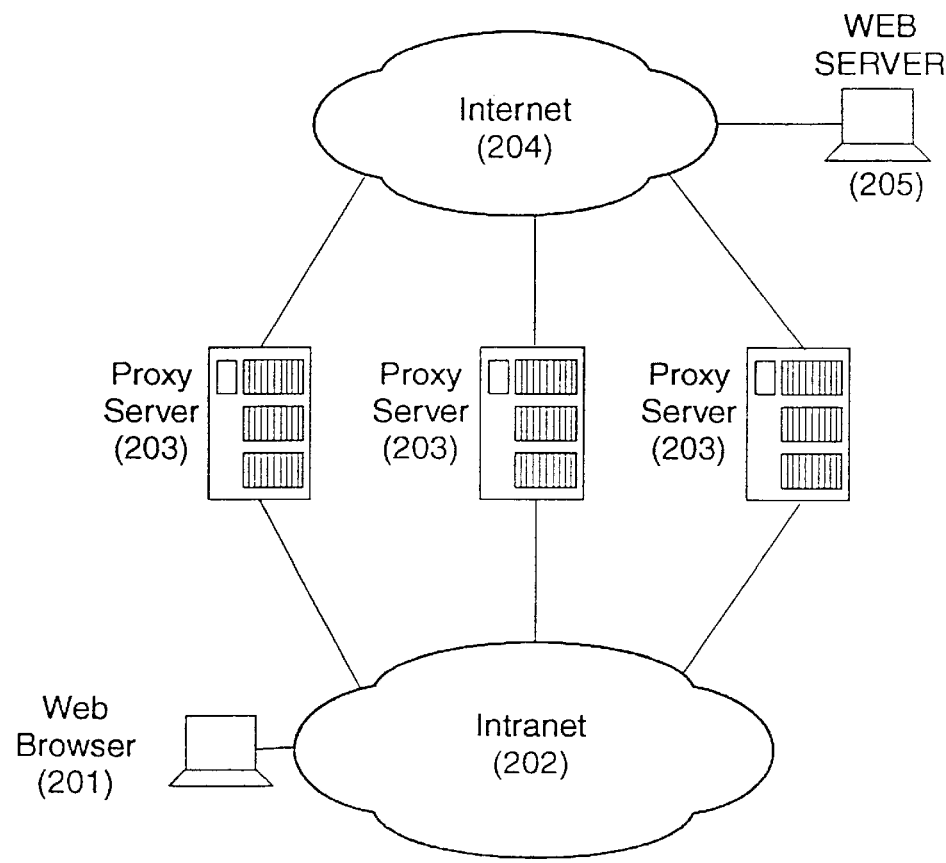
FIG. 2 is a general view of an end user system accessing the World Wide Web according to prior art.

FIG. 2 is a physical view of the set-up logically described in FIG. 1. In this particular example, the Web Browser 201 runs on a system (workstation) connected to an Intranet 202 network. The Intranet network comprises network devices such as IP Routers 206. The Proxy Servers 203 protecting the Intranet connect both the (private) Intranet 202 and the (public) Internet 204. The destination Web Server 205 is also connected to the Internet. It is important to note that Proxy Servers attach two networks and hence act as intermediaries for communications between said two networks. Multiple Proxy Servers are often used in order to provide access robustness and load sharing.

IP Datagram

Figure 3:
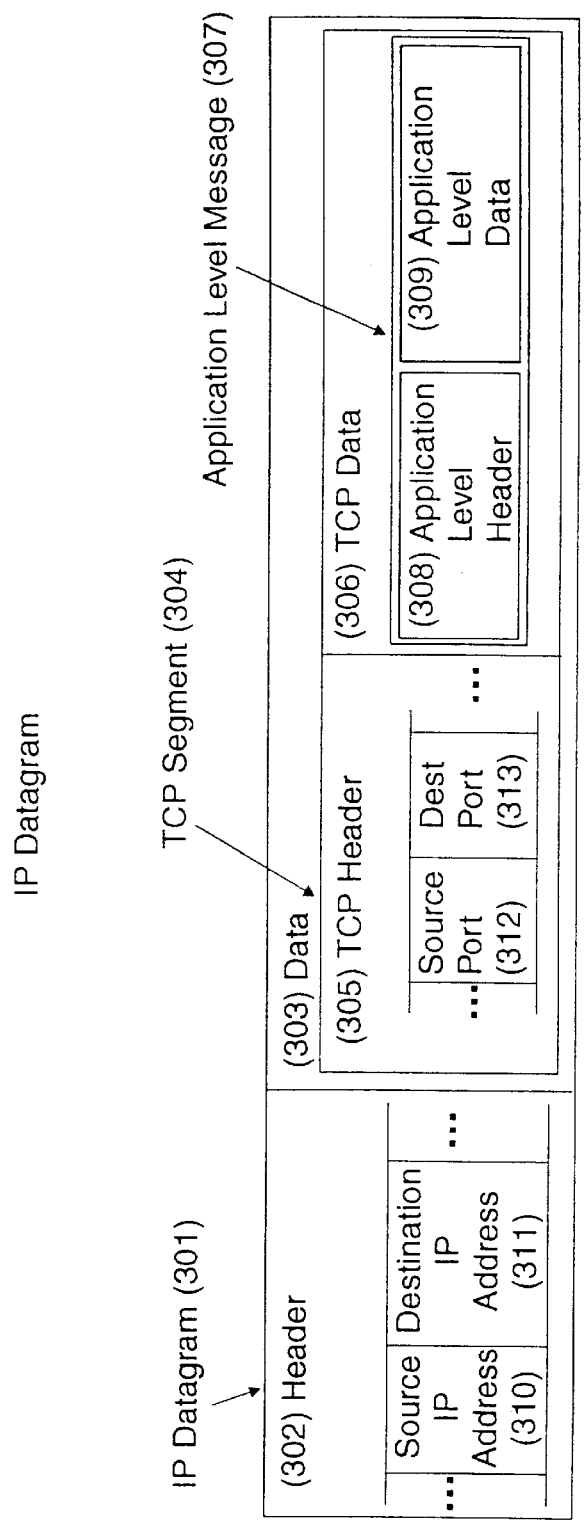
FIG. 3 shows an IP Datagram according to prior art.

The transfer unit of a data packet in TCP/IP is called an IP Datagram. It is made up of a header containing information for IP protocol and data that is only relevant to the higher level protocol. FIG. 3 shows the format of a IP Datagram, in the environment described in FIGS. 1 and 2:

301 IP Datagram. an IP Datagram is a message exchanged between 2 computer systems across a TCP/IP network. An IP Datagram is divided in 2 parts:
a Header, and
Data.

302 IP Datagram Header. the header comprises fields such as:
the Source IP Address 310 (the IP address of the computer which sends the IP Datagram).
the Destination IP Address 311 (the IP address of the computer which is the destination of the IP Datagram).

The IP Datagram Header is mainly used to route the IP Datagram to its final destination.

303 IP Datagram Data. This field comprises the data sent by the originator to the destination computer system. The destination computer system processes this data. Since the TCP/IP protocol suite is organised in layers, the IP Datagram field comprises the message relevant to the higher level protocol (which is TCP in the environment related to the invention).

304 TCP Segment. A TCP message is usually called TCP Segment.

305 TCP Header. A TCP Header comprises fields such as the Source Port 312 and the Destination Port 313 which identify the application level protocol (e.g. HTTP, FTP, Telnet, Socks) transported by TCP. This field is mainly used by the destination of the IP Datagram to determine which application must process the data transported by TCP.

306 TCP Data. The TCP Data field comprises application data which are sent by the originator to the destination computer system. The destination computer system processes the data. Since the TCP/IP protocol suite is organised in layers, the TCP Data part comprises the information relevant to the higher level protocol which is the Application level protocol (such as HTTP, FTP, Telnet, Socks).

307 Application Level Message. The TCP Data part of the IP Datagram contains an application level Message. This is, for example, a Socks message, a HTTP message, a FTP message, or a Telnet message. Depending on the Application level protocol, this application level Message can also be split into two parts.

308 Application Level Header. The application level Header is the header relevant to the application protocol such as HTTP, FTP, Telnet.

309 Application Level Data. This is the data part, which is processed by the application responsible of handling the application level protocol. This is usually the data which is directly relevant to the end user (for instance, data entered by an end user on his workstation).

Web Browser and Proxy Server

Figure 4:
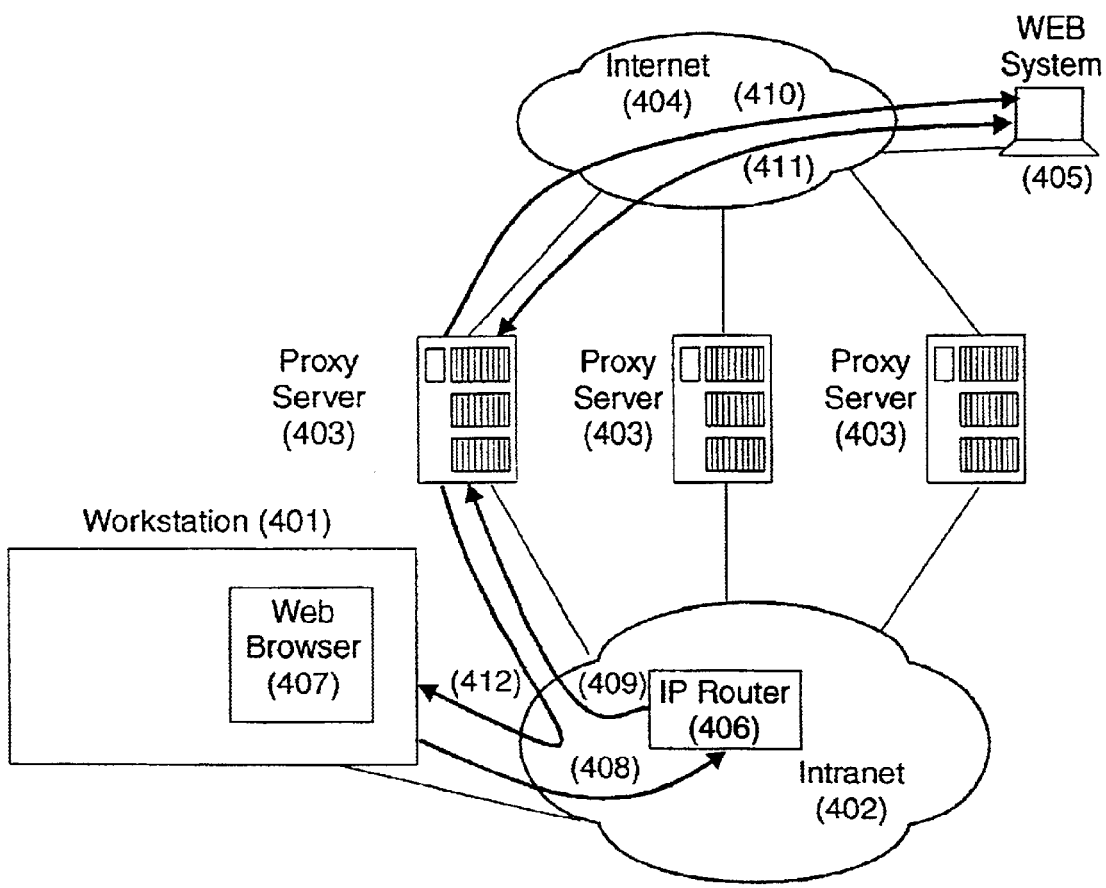
FIG. 4 shows an end user workstation with a plurality of Proxy Servers according to prior art.

FIG. 4 shows an end user workstation 401 connected to an Intranet 402. The Proxy Servers 403 that protect the Intranet attach both the (private) Intranet 402 and the (public) Internet 404. The destination Web System 405 also connects the Internet (the Web System is for instance a Web Server, a FTP Server, or any system attached to the Internet that can be accessed from the Intranet).

Each Proxy Server 403 stores in a local cache a local copy of the HTTP (and possibly FTP) data retrieved from Web Systems located on the Internet by workstations located on the Intranet.

The end user workstation 401 comprises a software program called Web Browser 406. The Web Browser is configured to access Web Systems located on the Internet, through a Proxy Server 403.

When the Web Browser wants to retrieve HTTP data (for instance a Web Page) from a destination Web System 405, the end user workstation sends 408 an IP Datagram comprising a request to retrieve said HTTP data to a destination Proxy Server on the Intranet network. IP Routers within the Intranet receive the IP Datagram and route it 409 towards its destination. Each IP Router determines the next hop within the Intranet, using the Destination IP Address field in the IP Datagram Header.

When the Proxy Server receives from the workstation a request to retrieve HTTP data (a Web Page) located on a destination Web System (a Web Server), the requested HTTP data is either already located in the local cache, or is not located in the local cache:

If the requested HTTP data is already located in the cache, the HTTP Proxy Server immediately answers 412 the request with a response comprising the data in the cache.

If the requested HTTP data is not located in the cache, the HTTP Proxy Server forwards 410 the request to the destination Web System (the Web Server). When the HTTP Proxy Server receives a response 411 comprising the HTTP data (the Web Page) from the destination Web System (the Web Server), said HTTP data (the Web page) are locally cached, and forwarded 412 to the originator system (the Web Browser).

The workstation can also comprise a Socks Client software in order to get access to Web Systems located on the Internet. In this case, said access is done through Socks Servers systems instead of being done through Proxy Servers.

IP Router System

Figure 5:
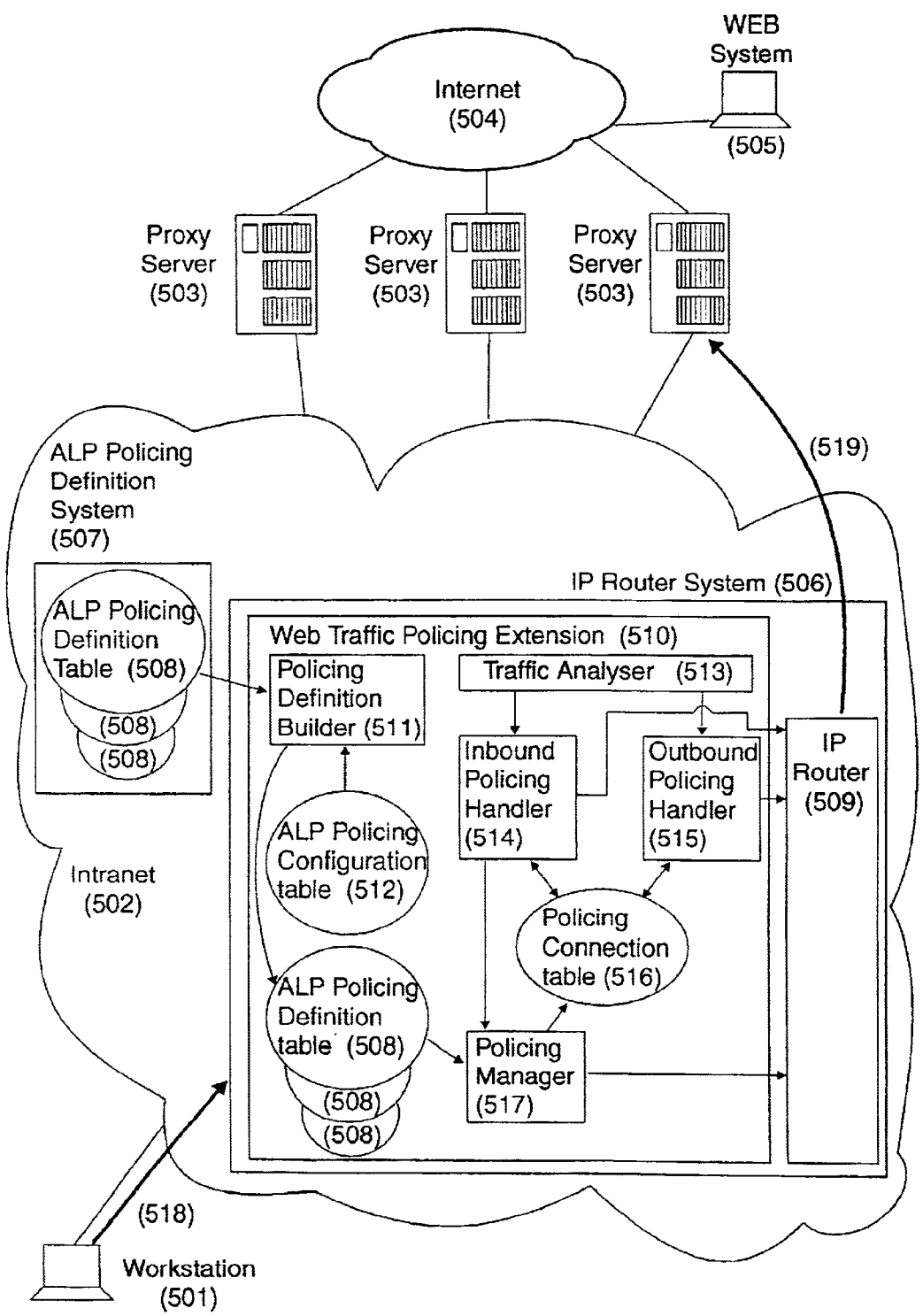
FIG. 5 shows a system for policing Web traffic, according to the present invention.

The present invention relates to a system and method for policing the Web Traffic within the Intranet. FIG. 5 is a view of a particular embodiment of the system used for policing the Web Traffic according to the present invention.

An end user workstation (a source device) 501 comprising a Web Browser is connected to the Intranet 502. Multiple Proxy Servers 503 are available to access the Web System 505 connected to the Internet 504. According to the present invention, a system called ALP (application level Protocol) Policing Definition system 507 and located within the Intranet network is defined. This ALP Policing Definition system comprises tables called ALP Policing Definition tables 508. An ALP Policing Definition table is configured for each ALP traffic item that needs to be policed within the Intranet. Typically, one table is configured for each major Web Application Level Protocols (such as HTTP, FTP, and Socks). The ALP Policing Definition table defined for each specific ALP, comprises information concerning the Web Traffic Policy for said ALP. In particular, each ALP Policing Definition table contains the list of authorized Servers that must be used as destination of the IP Datagrams transporting data using said ALP. For instance, the ALP Policing Definition table configured for HTTP comprises information concerning the list of HTTP Proxy Servers that must be used by workstations (source devices) within the Intranet to access Web Systems located on the Two mirrored ALP Policing Definition systems can possibly be used in order to provide a backup to the ALP Policing Definition tables (using for instance a Dispatcher system in front of the two systems).

An IP Router system 506 within the Intranet is in charge of routing IP Datagrams. According to the present invention, said IP Router system is also in charge of policing the Web Traffic. It comprises:

an IP Routing component 509 for routing any IP Datagram within the Intranet. This IP Router component can be any existing IP Router.

a Web Traffic Policing Extension component 510.

Web Traffic Policing Extension

The Web Traffic Policing Extension provides a method for policing the Web Traffic, within the IP Router system. The Web Traffic Policing Extension is configured with an ALP Policing Configuration table 512, said table comprising information concerning the ALP Policing Definition tables 508.

Once it is started, the Web Traffic Policing Extension immediately starts a Policing Definition Builder component.

511 The Policing Definition Builder component uses the ALP Policing Configuration table 512 to retrieve the ALP Policing Definition tables 508 from the ALP Policing Definition system 507, and stores a local copy 508 of said tables within the IP Router system.

When the IP Router System 506 receives 518 an IP Datagram from an end user workstation 501, this IP Datagram is forwarded to the Web Traffic Policing Extension 510. The IP Datagram is then forwarded in sequence to a plurality of other components to perform the method according to the present invention:

513 a Traffic Analyser component analyses the IP Datagram and determines if said IP Datagram is originated from a source device (a workstation) or from a server (a Proxy Server).

514 an Inbound Policing Handler component handles each IP Datagram originated by a source device. The Inbound Policing Handler:

determines if said IP Datagram must be updated, based on a Policing Connection table 516 and based on the Source IP address, Source Port, Destination IP address, and Destination Port fields of said IP Datagram, and if said IP Datagram must be updated, updates the Destination IP Address and the Destination Port fields of said IP Datagram using information retrieved from said Policing Connection table 516.

515 an Outbound Policing Handler component handles each IP Datagram originated by a server. The Outbound Policing Handler:

determines if said IP Datagram must be updated, based on a Policing Connection table 516 and based on the Source IP address, Source Port, Destination IP address, and Destination Port fields of said IP Datagram, and if said IP Datagram must be updated, updates the Source IP Address and the Source Port fields of said IP Datagram using information retrieved from said Policing Connection table 516.

517 a Policing Manager component handles each IP Datagram originated by a source device. The Policing Manager:

determines the ALP (application level Protocol) of the data comprised within said IP Datagram using the Destination Port field of said IP Datagram, retrieves the policy information for said IP Datagram from the ALP Policing Definition table 508 (defined for the ALP of the data comprised in said IP Datagram) using the Source IP address, Source Port, Destination IP address, and Destination Port fields of said IP Datagram.

If required by said policy information:

discards said IP Datagram, builds the Policing Connection table 516 with the characteristics of the IP Datagram and with said policy information.

updates the Destination IP Address and the Destination Port fields of said IP Datagram using said policy information.

The Web Traffic Policing Extension finally forwards the IP Datagram to the IP Router 509 component within the IP Router System. This IP Router component routes 519 the IP Datagram towards its destination. The invention is independent of the IP Router component and does not rely on the way the IP Datagram is handled and routed by this IP Router component.

The Web Traffic Policing Extension can be enabled or disabled on the IP Router system, by means for instance of a configuration parameter on said IP Router system. Typically, the Web Traffic Policing Extension:

is enabled on access IP Router systems at the edge of the Intranet.

is disabled on the IP Router systems located within the Intranet backbone.

Web Traffic Policing Extension Tables

FIG. 6 depicts the different tables used by the various components comprised within the Web Traffic Policing Extension.

The Web Traffic Policing Extension uses configuration tables 508 comprising Web Traffic policy information. There is one configuration table 508 for each ALP traffic item that needs to be policed within the Intranet. Typically, one table is configured for each major Web Application Level Protocol (such as HTTP, FTP, and Socks). Each configuration table is created (for instance by a Network Administrator) and stored within the ALP Policing Definition system 507 before starting the Web Policing Traffic Extension. The Web Policing Traffic Extension then retrieves and receives each ALP Policing Definition table from said ALP Policing Definition system 507.

606 ALP Policing Definition table. There is one table for each ALP traffic item that needs to be policed by the Web Traffic Policing Extension. Each table comprises for each source device (typically a workstation) within the Intranet or for each group of source devices (typically a group of workstations):

the address of the Server that should be used as destination of the IP Datagrams originated from said source device (or group of source devices) and comprising data using said ALP, and an indication for discarding said IP Datagrams.

The Web Traffic Policing Extension also uses a configuration table 512 comprising information concerning each ALP Policing Definition table. This configuration table is created (for instance by a Network Administrator) before the Web Policing Traffic Extension is started.

601 ALP Policing Configuration table. This table comprises for each application level Protocol:

the address of the associated ALP Policing Definition table which comprises policing information for said ALP, and the frequency for retrieving said ALP Policing Definition table.

The other table is dynamically built and used by the Web Traffic Policing Extension for internal purpose:

612 Policing Connection table. This table comprises for each source device originating the Web Traffic policed by the Web Traffic Policing Extension:

the destination Server used in the IP Datagrams originated from said source device, and the destination Server which is used as enforced destination of said policed traffic.

These three tables are detailed in FIG. 6.

ALP Policing Configuration Table

The ALP Policing Configuration table 601 (a flat file in a preferred embodiment) is created by the Network Administrator in charge of the Intranet. This table associates each application level Protocol with the address of the ALP Policing Definition table which comprises policy information for said ALP traffic, and the frequency for retrieving said ALP Policing Definition table. The table comprises a list of records 602, each record comprising the following information:

603 ALP (application level Protocol). There is one value for each application level protocol that needs to be policed by the Web Traffic Policing Extension. Typically, one record is defined for each of the main Web Protocols including HTTP, FTP, and Socks.

604 ALP Policing_Definition_Address. This is the address of the ALP Policing Definition table defined for each ALP 603, and which is located on the ALP Policing Definition system 507. This information is used by the Web Traffic Policing Extension to retrieve the ALP Policing Definition table 508 from the ALP Policing Definition system 507.

605 Frequency. The Web Traffic Policing Extension waits a given period of time before retrieving a new version of the ALP Policing Definition table from the ALP Policing Definition system. The Frequency is used by the Web Traffic Policing Extension to periodically update the local copy of the ALP Policing Definition table.

ALP Policing Definition Table

Each ALP Policing Configuration table 606 (a flat file in a preferred embodiment) is created by the Network Administrator in charge of the Intranet. There is one table for each ALP traffic item that needs to be policed by the Web Traffic Policing Extension. Each table associates each source device (typically a workstation) or group of source devices within the Intranet, with:

the address of the Server that should be used as the destination of IP Datagrams originated from said source device (or group of source devices) and comprising data using said ALP, an indication for discarding said IP Datagrams.

The table contains a list of records (607), each record comprising the following information:

608 Client_IP_Address. This is the IP address of a source device (typically a workstation) within the Intranet, or a range of IP addresses associated to a group of source devices within the Intranet (for instance all workstations located at a specific site). Typically, one record 607 is defined for each source device (or group of source devices) at the origin of the traffic the Network Administrator wants to police.

609 Server_IP_Address. This is the IP address of the Server system which must be used by the source device 608

(or group of source devices) for the ALP traffic it originates. The Server_IP_Address should be the destination IP address 311 of the IP Datagrams:

sent by the source device 608, and comprising TCP data 306 using the application level protocol associated with the table 606 (one table is defined for each ALP).

For instance, the ALP Policing Definition table configured for HTTP comprises the list of HTTP Proxy Servers that must be used by the workstations within the Intranet to access Web Systems located on the Internet. The Server_IP_Address is then the IP address of the HTTP Proxy Server that should use the workstation 608.

610 Server_Port. This is the Port number identifying the program (application) running on the Server system identified by the Server_IP_Address 609, and which must be used to process the ALP traffic. Server_Port is the Port number that should be used as destination Port 313 for IP Datagrams:

sent by the source device 608, and comprising TCP data 306 using the application level protocol associated to the table 606 (one table is defined for each ALP).

For instance, the ALP Policing Definition table configured for HTTP comprises the list of HTTP Proxy Servers that should be used by the workstations within the Intranet to access Web Systems located on the Internet. The Server_Port is then the Port number (for instance 80) of the program running on the HTTP Proxy Servers to handle HTTP traffic. This Port number should then be used by the workstation 608 as destination port for HTTP traffic sent to the HTTP Proxy Server identified by Server_IP_Address 609.

611 Enforce Discard. This is an indication for discarding IP Datagrams originated by the source device 608. The value of Enforce_Discard indication can be "Yes" or "No":

"Yes" means that the IP Datagram which destination is not the Server system 609 must be discarded by the Web Traffic Policing Extension.

"No" means that the IP Datagram which destination is not the Server system 609 must not be discarded by the Web Traffic Policing Extension.

The table comprises a default record for all source devices which are not explicitly defined in a specific record 607.

Policing Connection Table

The Policing Connection table 612 is an internal table built by the Policing Manager component and used by the Inbound Policing Handler and the Outbound Policing Handler components. This table is used to store for each source device which originates Web Traffic policed by the Web Traffic Policing Extension:

the destination Server used by the IP Datagrams originated from said source device, and the destination Server used as enforced destination for said policed traffic.

The table contains a list of records 613, each record providing the following information:

614 Client_IP_Address. This is the IP address of the source device which originates traffic to police. Client_IP_Address contains the value of the Source IP address field 310 of IP Datagrams belonging to said traffic.

615 Client_Port. This is the number of the Port identifying the program (the application) running on the source device originating the traffic to police (this application is called the "source application"). Client_Port comprises the value of the Source Port field 312 of IP Datagrams belonging to said traffic.

Typically, there is one record 613 for each system within the Intranet originating Web Traffic to police. Each system is identified in a unique way by means of a source device (identified by Client_IP_Address 614) and a source application (identified by Client_Port 615). Each record 613 is then identified in a unique way by its Client_IP_Address 614 and its Client_Port 615.

616 Dest_IP_Address. This is the IP address of the Server system, destination of the IP Datagrams originated by the source application identified by Client_Port 615 and running on the source device identified by Client_IP_Address 614. Dest_IP_Address contains the value of the Destination IP address field 311 of said IP Datagrams.

617 Dest_Port. This is the number of the Port identifying the program (the application) running on the Server system 616, destination of the IP Datagrams originated by the source application identified by Client_Port 615 and running on the source device identified by Client_IP_Address 614. Dest_Port contains the value of the Destination Port field 311 of said IP Datagrams.

618 Server_IP_Address. This is the IP address of the Server system that must be the destination of the IP Datagrams originated by the source application identified by Client_Port 615 running on the source device identified by Client_IP_Address 614. Server_IP_Address is determined by the Policing Manager component using the ALP Policing Definition tables.

619 Server_Port. This is the number of the Port identifying the program (the application) running on the server system 616 that must be the destination of the IP Datagrams originated by the source application identified by Client_Port 615 running on the source device identified by Client_IP_Address 614. Server_Port is determined by the Policing Manager component using the ALP Policing Definition tables.

Policing Definition Builder

The Policing Definition Builder component of the Web Traffic Policing Extension is preferably a computer program running on the IP Router System.

This component is in charge of:

retrieving the ALP Policing Definition tables 606 from the ALP Policing Definition system 507, using the ALP Policing Configuration table 601, and storing a local copy 508 of said tables within the IP Router system.

Figure 7:
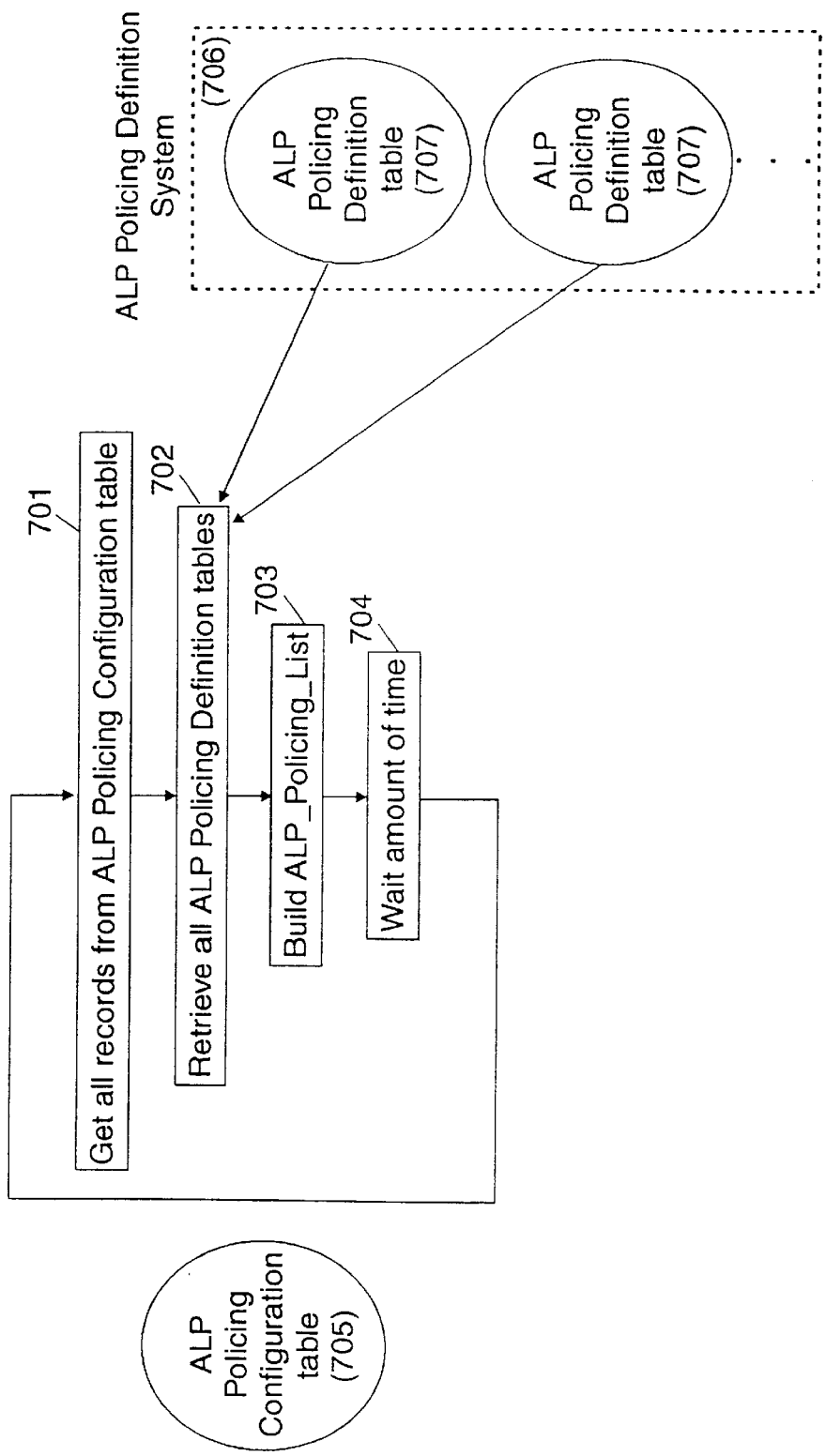
FIG. 7 is a flow chart of the Policing Definition Builder component, according to the present invention.

The Policing Definition Builder component immediately starts when the Web Traffic Policing Extension starts. FIG. 7 is a flow chart which refers to the internal logic of the Policing Definition Builder component. This component:

701 retrieves all records from the ALP Policing Configuration table 601, 705, and

702 for each record (ALP) 603 in the ALP Policing Configuration table 705:

retrieves the ALP Policing Definition table 707 associated with the ALP 603 from the ALP Policing Definition system 706. Said table is retrieved using the ALP_Policing_Definition_Address 604. Said table will be used by the Web Traffic Policing Extension to police the traffic associated with said ALP 603. Preferably, the HTTP (or FTP) protocol is used to retrieve said table (the ALP_Policing_Definition_Address is used as URL).

Encrypted protocols (such as Secure HTTP) can also be used.

stores a local copy 508 of said retrieved ALP Policing Definition table within the network device where the Web Traffic Policing Extension is running.

703 builds a list (ALP_Policing_List) with the application level protocols recorded in the ALP Policing Configuration table 705. Since there is one record 603 per ALP traffic item that must be policed, ALP_Policing_List comprises the list of all ALPs (for instance HTTP, FTP, Socks) which must be policed by the Web Traffic Policing Extension.

704 waits for some amount of time, before looping back to 701 to retrieve again the ALP Policing Definition tables 707. This amount of time is deducted from the Frequency field 605 within the ALP Policing Configuration table 601. For instance, a Frequency 605 of 30 minutes in the record 602 defined for HTTP 603 indicates that the ALP Policing Definition table defined for HTTP will be retrieved every 30 minutes from the ALP Policing Definition system. This mechanism enables the Policing Definition Builder (hence the Web Traffic Policing Extension) to periodically retrieve and store updates of the ALP Policing Definition tables.

Possibly, the ALP Policing Definition system 706 can register the Policing Definition Builder in order to automatically send it updates of the ALP Policing Definition tables.

Traffic Analyser

The Traffic Analyser component of the Web Traffic Policing Extension is preferably a computer program running on the IP Router System. This component is in charge of determining if each received IP Datagram is originated from a source device (typically a workstation) or from a server system (typically a Proxy Server).

Figure 8:
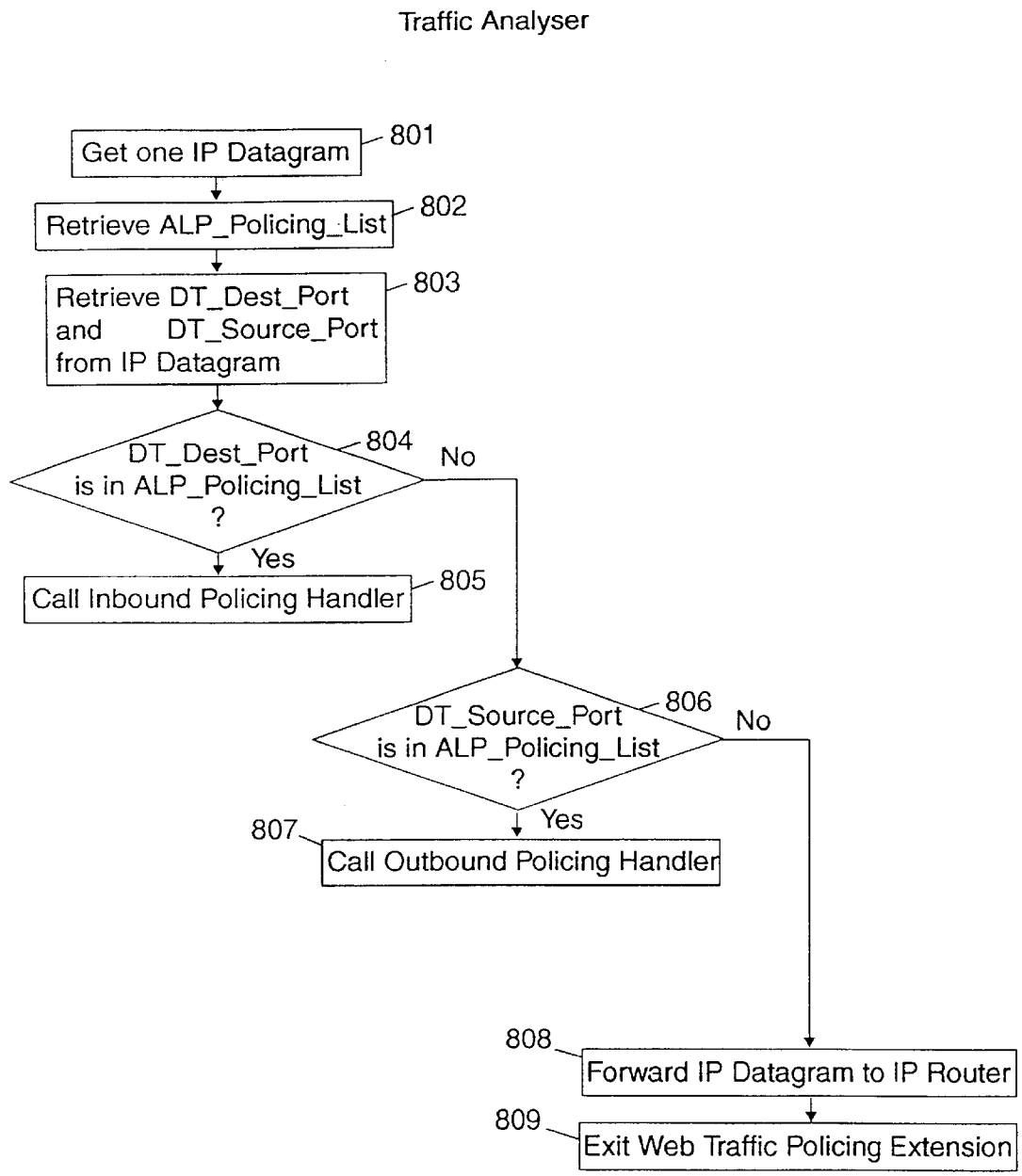
FIG. 8 is a flow chart of the Traffic Analyser component, according to the present invention.

FIG. 8 is a flow chart which refers to the internal logic of the Traffic Analyser component. This component:

801 retrieves an IP Datagram (the incoming IP Datagram).

802 gets ALP_Policing List from the Policing Definition Builder. ALP_Policing_List comprises the list of all ALPs (for instance HTTP, FTP, Socks) which must be policed by the Web Traffic Policing Extension.

803 retrieves from the IP Datagram, information related to the ALP used by the data 303 comprised within said IP Datagram.

DT_Dest_Port=Destination Port field 313 (in TCP Header 305 of said IP Datagram)

DT_Source_Port=Source Port field 312 (in TCP Header 305 of said IP Datagram)

804 tests whether or not the IP Datagram is originated from a source device and comprises data that uses an ALP which must be policed. If DT_Dest_Port is listed in ALP_Policing_List, then the IP Datagram is originated from a source device and comprises data 303 that uses an ALP traffic which must be policed.

If DT_Dest_Port is listed in ALP_Policing List, 805 calls Inbound Policing Handler If DT_Dest_Port is not listed in ALP_Policing_List, 806 tests whether or not the IP Datagram is originated from a Server system and comprises data that uses an ALP which must be policed.

If DT_Source_Port is listed in ALP_Policing_List, then the IP Datagram is originated from a Server system and comprises data 303 that uses an ALP traffic which must be policed.

If DT_Source_Port is listed in ALP_Policing List, 807 calls Outbound Policing Handler If DT_Source_Port is not listed in ALP_Policing_List Then the IP Datagram does not comprise data which uses an ALP that must be policed.

808 forwards the IP Datagram to the IP Router component

809 exits the Web Traffic Policing Extension, and waits for the next IP Datagram.

Inbound Policing Handler

The Inbound Policing Handler component of the Web Traffic Policing Extension is preferably a computer program running on the IP Router System. This component handles each IP Datagram originated by a source device, and is in charge of:

determining if said IP Datagram must be updated, based on a Policing Connection table 612 and based on the Source IP address, Source Port, Destination IP address, and Destination Port fields of said IP Datagram, and if said IP Datagram must be updated, updating the Destination IP Address and the Destination Port fields of said IP Datagram using information retrieved from said Policing Connection table 612.

Figure 9:
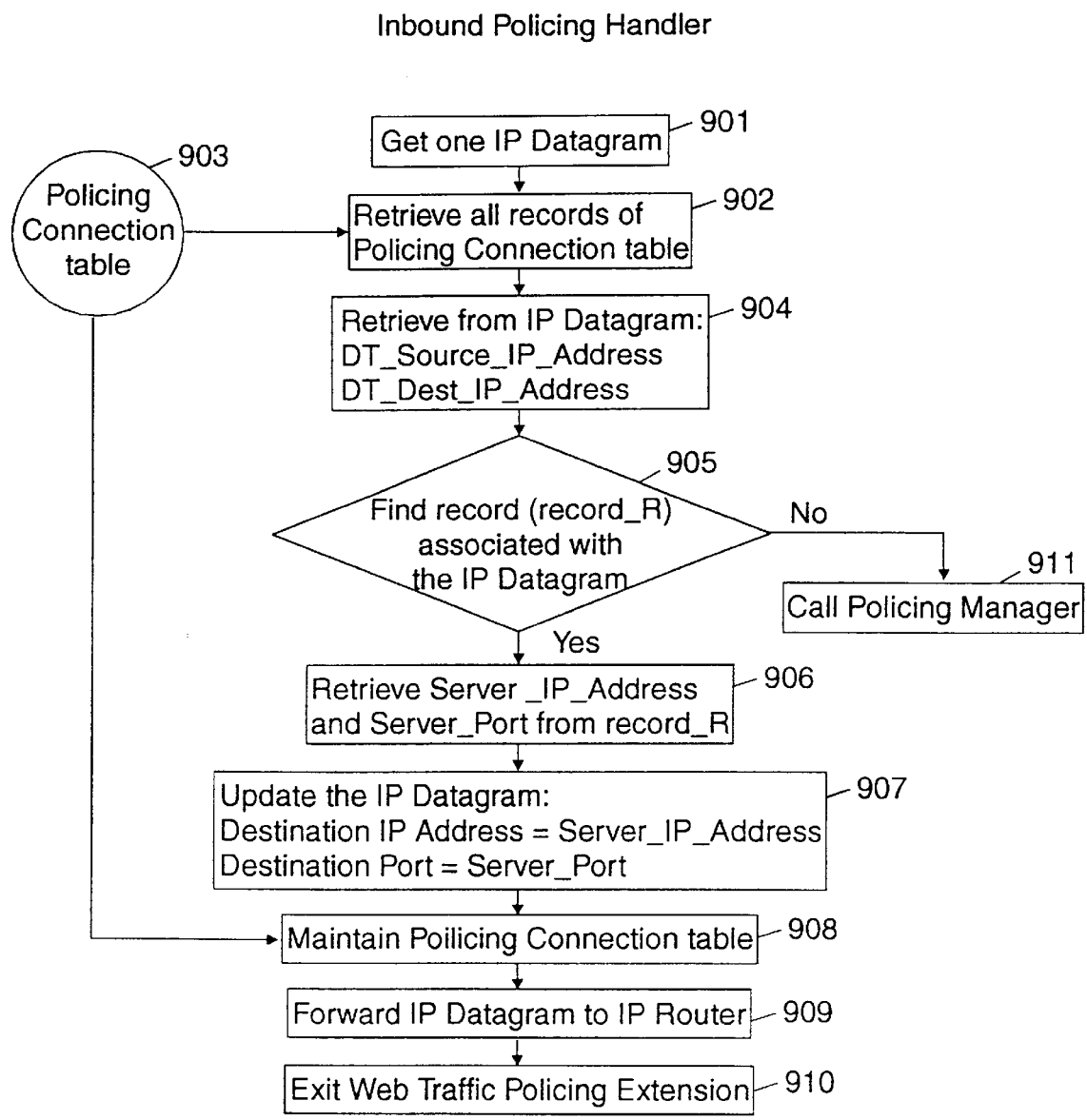
FIG. 9 is a flow chart of the Inbound Policing Handler component, according to the present invention.

FIG 9 is a flow chart which refers to the internal logic of the Inbound Policing Handler component. This component:

901 retrieves one IP Datagram,

902 retrieves all records of the Policing Connection table 903,

904 retrieves from the IP Datagram, information indicating the source and the destination of said IP Datagram:

DT_Source_IP_Address=Source IP Address 310 (in IP Header 302 of said IP Datagram)

DT_Dest_IP_Address=Destination IP Address field 311 (in IP Header 302 of said IP Datagram)

905 finds in the Policing Connection table 903 a record 613 identified by (four conditions):

Client_IP_Address 614=DT_Source_IP_Address

Client_Port 615=DT_Source_Port

Dest_IP_Address 616=DT_Dest_IP_Address

Des_Port 617=DT_Dest_Port

If there is no record satisfying said four conditions:

Then the IP Datagram belongs to a connection which is not yet defined within the Policing Connection table.

911 calls the Policing Manager component.

If there is a record (called "record_R") satisfying said four conditions then the IP Datagram belongs to a connection which is already defined within the Policing Connection table.

906 retrieves from "record_R" the information indicating which Server system is the destination Server system of the IP Datagram:

Server_IP_Address 618

Server_Port 619.

907 updates the IP Datagram with information identifying said destination Server system:

Destination IP address field 311 in IP Header 302 =Server_IP_Address 618

Destination Port field 313 in TCP Header 305=Server_Port 619

This enforces the IP Datagram to be sent to the destination server system 618 which is defined in the Web Traffic Policy. The values of checksum fields comprised in the IP Datagram (for instance the Header Checksum in the IP Header) are updated accordingly.

908 maintains the Policing Connection table 908 and in particular removes from the Policing Connection table 908 records belonging to closed connections. Closed connections are detected for instance using the FIN and ACK indications in the TCP Header. Optionally, a connection is considered closed after a certain period of time without IP Datagram on that connection (this timer value can be for instance a configuration parameter of the Web Traffic Policing Extension). Any other existing algorithm to detect closed or half closed (for instance when one extremity of the connection has abnormally terminated) TCP connections can also be used to remove such connections from the table.

909 forwards the updated IP Datagram to the IP Router component. The updated IP Datagram is then sent to the Server system defined in the Web Traffic Policy.

910 exits the Web Traffic Policing Extension, and waits for the next IP Datagram.

Policing Manager

The Policing Manager component of the Web Traffic Policing Extension is preferably a computer program running on the IP Router System. This component handles each IP Datagram originated by a source device. It is in charge of:

determining the ALP (application level Protocol) of the data comprised within said IP Datagram using the Destination Port field of said IP Datagram, retrieving some policy information related to said IP Datagram from the ALP Policing Definition table 508 defined for the ALP of the data comprised in said IP Datagram, using the Source IP address, Source Port, Destination IP address, and Destination Port fields of said IP Datagram.

If required by said policy information:

discarding said IP Datagram, building the Policing Connection table 612 with the characteristics of the IP Datagram and with said policy information.

updating the Destination IP Address and the Destination Port fields of said IP Datagram using said policy information.

Figure 10:
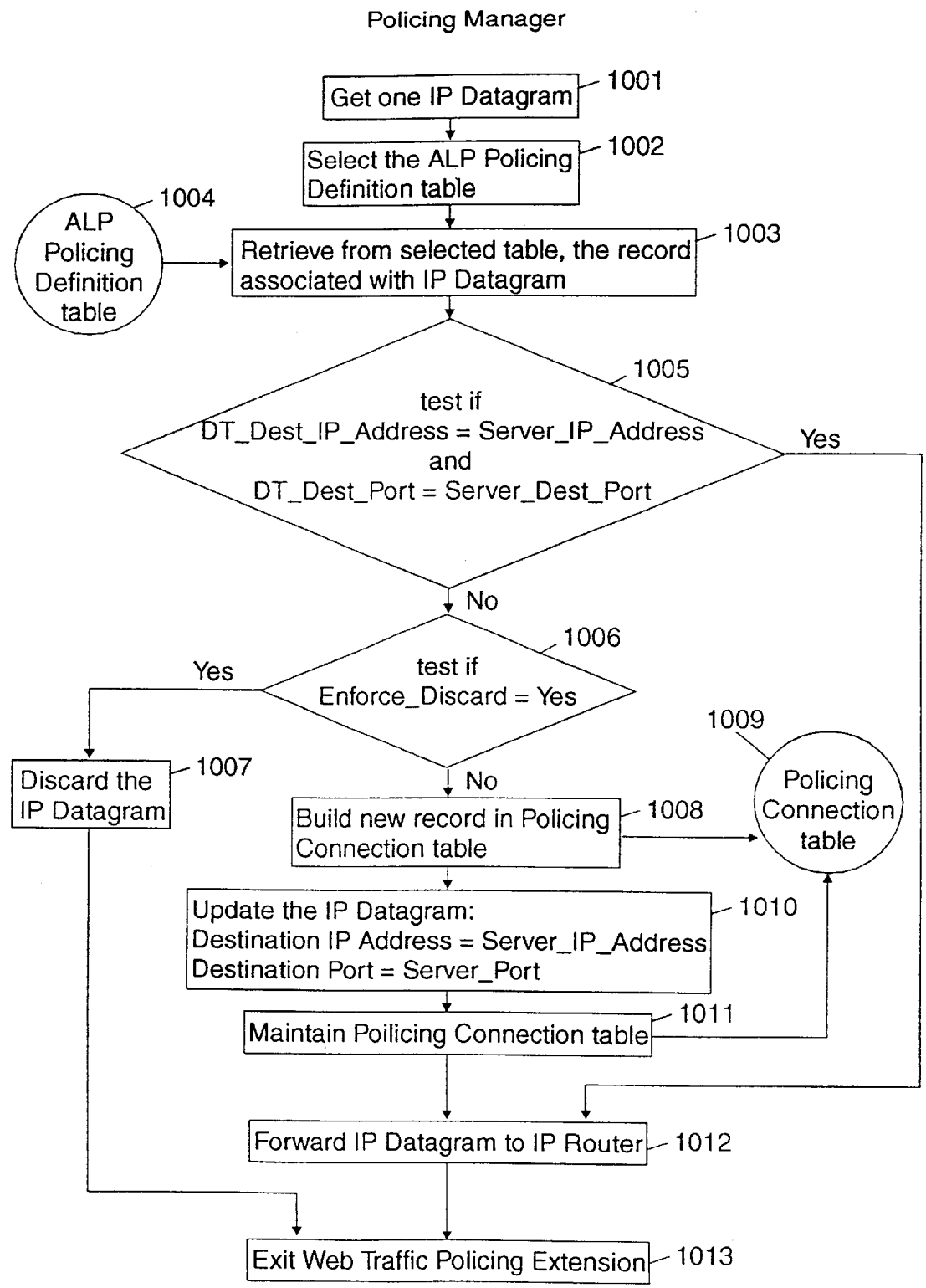
FIG. 10 is a flow chart of the Outbound Policing Handler component, according to the present invention.

FIG. 10 is a flow chart which refers to the internal logic of the Policing Manager component. This component:

1001 retrieves one IP Datagram.

1002 selects the ALP Policing Definition table, which must be used for policing the IP Datagram. Said table is associated with the ALP used by the data comprised within the IP Datagram. Said ALP is equal to the DT_Dest_Port. For instance, if the IP Datagram comprises data using HTTP, then the selected table is the ALP Policing Definition table associated with the HTTP protocol.

1003 retrieves from said selected ALP Policing Definition table 1004, the record (called "record_P") associated with the IP Datagram. Said record is identified by:

Client_IP_Address 608=DT_Source_IP_Address (Client_IP_Address is a specific IP Address identifying one source device), or Client_IP_Address 608 comprises DT_Source_IP_Address (Client_IP_Address is an IP Address range identifying one group of source devices),

1005 tests whether the IP Datagram must be policed. The IP Datagram must be policed when the destination system is not the Server system which should be used. The test uses some policy information retrieved from "record_P". If (both conditions):

DT_Dest_IP_Address=Server_IP_Address 609, and

DT_Dest_Port=Server_Port 610 then the destination of the IP Datagram is the Server system which must be used, and therefore the IP Datagram does not need to be policed. Otherwise, the IP Datagram must be policed.

If the IP Datagram does not need to be policed:

1012 forwards the IP Datagram to the IP Router component. The IP Datagram will then be sent to the Server system which has been correctly set by the source device. No Web Traffic Policy is enforced.

1013 exits the Web Traffic Policing Extension, and waits for the next IP Datagram.

If the IP Datagram must be policed:

1006 tests whether or not the IP Datagram must be discarded. The IP Datagram must be discarded if Enforce_Discard 611="Yes" in "record_P".

If the IP Datagram must be discarded:

1007: discards the IP Datagram

1013 exits the Web Traffic Policing Extension, and waits for the next IP Datagram.

If the IP Datagram must not be discarded:

1008 creates a new record 613 in the Policing Connection table 1009 for the connection of the IP Datagram:

Client_IP_Address=DT_Source_IP_Address
Client_Port_Address=DT_Port_Address
Dest_IP_Address=DT_Dest_IP_Address
Dest_Port=DT_Dest_Port
Server_IP_Address=Server_IP_Address 609 (from "record_P")
Server_Port=Server_Port 610 (from "record_P").

1010 updates the IP Datagram with information identifying the destination Server system that must be used:

Destination IP address field 311 in IP Header 302=Server_IP_Address 609

Destination Port field 313 in TCP Header 305=Server_Port 610

This enforces the IP Datagram to be sent to the destination Server system 609 defined in the Web Traffic Policy. The values of checksum fields comprised in the IP Datagram (for instance the Header Checksum in the IP Header) are updated accordingly.

1011 maintains the Policing Connection table 908 and in particular removes from the Policing Connection table 908 records belonging to closed connections. Closed connections are detected for instance using the FIN and ACK indications in the TCP Header. Optionally, a connection is considered closed after a certain period of time without IP Datagram on that connection (this timer value can be for instance a cofiguration parameter of the Web Traffic Policing Extension). Any other existing algorithm to detect closed or half closed (for instance when one extremity of the connection has abnormally terminated) TCP connections can also be used to remove such connections from the table.

1012 forwards the updated IP Datagram to the IP Router component. The updated IP Datagram is then sent to the server system defined in the Web Traffic Policy.

1013 exits the Web Traffic Policing Extension, and waits the next IP Datagram.

Outbound Policing Handler

The Outbound Policing Handler component of the Web Traffic Policing Extension is preferably a computer program running on the IP Router System. This component handles each IP Datagram originated by a Server system. It is in charge of:

determining if said IP Datagram must be updated, based on a Policing Connection table 612 and based on the Source IP address, Source Port, Destination IP address, and Destination Port fields of said IP Datagram, and if said IP Datagram must be updated, updating the Source IP Address and the Source Port fields of said IP Datagram using information retrieved from said Policing Connection table 612.

Figure 11:
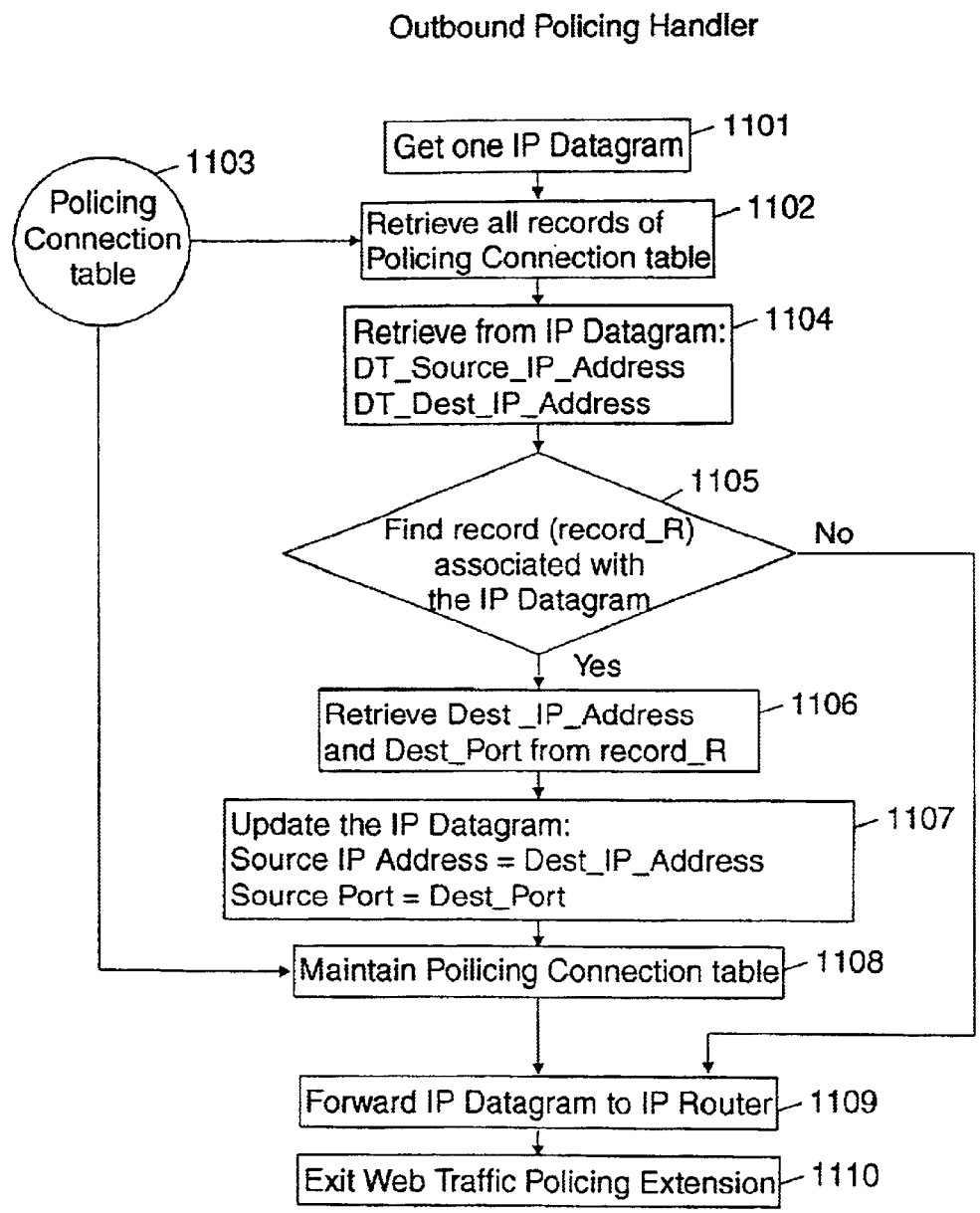
FIG. 11 is a flow chart of the Policing Manager component, according to the present invention.

FIG. 11 is a flow chart which refers to the internal logic of the Outbound Policing Handler component. This component:

1101 retrieves one IP Datagram.

1102 retrieves all records of the Policing Connection table 1103

1104 retrieves from the IP Datagram, information indicating the source and the destination of said IP Datagram:
- DT_Source_IP_Address=Source IP Address 310 (in IP Header 302 of said IP Datagram)
- DT_Dest_IP_Address=Destination IP Address field 311 (in IP Header 302 of said IP Datagram)

1105 finds in the Policing Connection table 1103 one record 613 identified by (four conditions):
- Client_IP_Address 614=DT_Dest_IP_Address
- Client_Port 615=DT_Dest_Port
- Server_IP_Address 618=DT_Source_IP_Address
- Server_Port 619=DT_Source_Port If there is no record satisfying said four conditions, then the IP Datagram belongs to a connection which is not defined within the Policing Connection table. There is therefore no Web Traffic policing required for the IP Datagram.

1109 forwards the IP Datagram to the IP Router component.

1110 exits the Web Traffic Policing Extension, and waits for the next IP Datagram.

If there is a record (called "record_R") satisfying said four conditions, then the IP Datagram belongs to a connection which is already defined within the Policing Connection table.

1106 retrieves from "record_R" information indicating the destination system of the IP Datagram originated from the source device:
- Dest_IP_Address 616
- Dest_Port 617

1107 updates the IP Datagram with information identifying said destination system:
- Source IP address field 310 in IP Header 302=Dest_IP_Address 616.
- Source Port field 312 in TCP Header 305=Dest_Port 617.

This way, the IP Datagram appears as being sent by the system 616 which is destination of the IP Datagrams originated by the source device 614. The values of checksum fields comprised in the IP Datagram (for instance the Header Checksum in the IP Header) are updated accordingly.

1108 maintains the Policing Connection table 1103 and in particular removes from the Policing Connection table 908 records associated with closed connections. Closed connections are detected for instance using the FIN and ACK indications in the TCP Header. Optionally, a connection is considered closed after a certain period of time without IP Datagram on that connection (this timer value can be for instance a configuration parameter of the Web Traffic Policing Extension). Any other existing algorithm to detect closed or half closed (for instance when one extremity of the connection has abnormally terminated) TCP connections can also be used to remove such connections from the table.

1109 forwards the updated IP Datagram to the IP Router. The updated IP Datagram is then sent to the server system which has been defined in the Web Traffic Policy.

1109 exits the Web Traffic Policing Extension, and waits for the next IP Datagram.

Advantages

The present inventions provides the following advantages:

The Web Traffic Policy is defined at one central location (the ALP Policing Definition system), and does not have to be configured on multiple network devices or workstations.

Updates related to the Web Traffic Policy can be periodically retrieved by network devices comprising the Web Traffic Policing Extension. For instance, a new Proxy Server may be setup for a group of source devices in order to provide a better Web access service. Because it periodically retrieves the Web Traffic Policy updates, the Web Traffic Policing Extension is then able to enforce towards said new Proxy Server the traffic originated by said group of source devices.

Updates of the Web Traffic Policy can be automatically received by network devices comprising the Web Traffic Policing Extension. For instance, a new Proxy Server may be set-up for a group of source devices in order to provide a better Web access service. Because it automatically receives the Web Traffic Policy updates, the Web Traffic Policing Extension is then able to enforce towards said new Proxy Server the traffic originated by said group of source devices.

The Web Traffic Policy enforces Web Traffic originated by end user workstations to use predefined servers within the Intranet even when the end user workstations are not correctly configured. Since the Web Traffic Policing is done within the Intranet (by the Web Traffic Policing Extension), an error in the configuration of an end user workstation can be corrected. For instance, a workstation located in Toulouse (France) may be configured to send HTTP traffic to an HTTP Proxy Server located in Paris. The Web Traffic Policing Extension can direct said traffic to a closer HTTP Proxy Server (for instance an HTTP Proxy Server located in Toulouse).

The network resources within the Intranet are optimized. For instance, the specifications and therefore the cost of Proxy Servers is related to the number of source devices which will access it. A Proxy Server which will be accessed by 500 source devices will be smaller and therefore cheaper than a Proxy Server which will be accessed by 10000 source devices.

The performance of the Web access service is improved. For instance, when a Proxy Server is set-up in France, it is configured to provide Web access service to a specified number of source devices in France. When more source devices (for instance source devices located in Belgium) than expected are accessing said Proxy Server, the performance of said Proxy server may be degraded with an impact on the performance of the Web access service. The Web Traffic Policy ensures that the servers are not accessed by unexpected source devices.

The utilization of network resources is optimized. In particular, bandwidth within the Intranet is saved. For instance, when a source device located in France wants to access a Web System through a Proxy Server, said source device will use a Proxy server located in France instead of any other Proxy Server (for instance a Proxy Server located in Japan). The path within the Intranet to reach the Proxy Server is minimized (the utilization of network resources and the required bandwidth between France and Japan are also minimized).

There is no impact nor dependency on the end user workstation. No specific software is required on end user workstations.

While the invention has been particularly shown and described with reference to a preferred embodiment, it will be understood that various changes in form and detail may be made therein without departing from the spirit, and scope of the invention. In particular the present invention is not limited to Web Traffic handled by Proxy Servers, but relates to any IP traffic (Socks, FTP, HTTP, . . . ) handled by any Server in the Intranet (Socks Servers, FTP Servers, Web Servers, . . . ).

What is claimed is:

1. A method for managing data traffic within an Intranet, the Intranet comprising a client computer, a router system, and at least one proxy server, the method comprising:

transmitting a datagram to a traffic analyser in a router system, the traffic analyser determining if the datagram originated from a client computer in the Intranet, in response to the traffic analyser determining that the datagram originated from a client computer in the Intranet, transmitting the datagram to an inbound policing handler, the inbound policing handler updating a destination address for the datagram to a proxy server specified by an application level protocol used by the datagram, the proxy server specified being determined by a policing manager according to an application level protocol policing definition table;

comparing the proxy server, determined by the policing manager, to a list of authorized proxy servers, the authorized proxy servers being previously authorized to receive only datagrams using the application level protocol used by the datagram originating from the client computer; and in response to determining that the proxy server determined by the policing manager is on the list of authorized proxy servers, transmitting the datagram to the authorized proxy server, and in response to determining that the proxy server is not on the list of authorized proxy servers, discarding the datagram.

2. The method of claim 1, further comprising:

setting, by the router system, a maximum limit of how many client computers in the Intranet are authorized to send datagrams to the proxy server.

3. The method of claim 2, wherein the maximum limit is 500.

4. The method of claim 1, wherein all datagram traffic within the Intranet is policed by the steps of claim 1, such that any client computer in the Intranet can communicate with an Internet only by routing datagrams through the authorized proxy server, the proxy server being selected according to the application level protocol used by the datagram and by a physical proximity of the proxy server to the client computer.

5. A router system for managing data traffic within an Intranet, the router system comprising:

a traffic analyser that determines if a received datagram originated from a client computer in the Intranet;

an inbound policing handler that, responsive to the traffic analyser determining that the datagram originated from a client computer in the Intranet, transmits the datagram to an inbound policing handler, the inbound policing handler updating a destination address for the datagram to a proxy server specified by an application level protocol of the datagram, the proxy server specified being determined by a policing manager according to an application level protocol policing definition table;

a policing manager that compares the proxy server, determined by the policing manager, to a list of authorized proxy servers determined by the application level protocol of the datagram; and a router that, in response to the policing manager determining that the proxy server determined by the policing manager is on the list of authorized proxy servers, transmits the datagram to the authorized proxy server, and in response to determining that the proxy server is not authorized, discarding the datagram.

6. The router system of claim 5, wherein a maximum limit is set for the number of client computers in the Intranet that can send datagrams to the proxy server.

7. The router system of claim 6, wherein the maximum limit is 500.

8. The router system of claim 5, wherein all datagram traffic within an Intranet is policed by the router system, such that any client computer in the Intranet can communicate with an Internet only by routing datagrams through the authorized proxy server, the proxy server being selected according to the application level protocol used by the datagram and by a physical proximity of the proxy server to the client computer.

* * * * *